United States Patent
Le Maguet

(10) Patent No.: US 6,628,712 B1
(45) Date of Patent: Sep. 30, 2003

(54) SEAMLESS SWITCHING OF MPEG VIDEO STREAMS

(75) Inventor: Yann Le Maguet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 456 days.

(21) Appl. No.: 09/708,165

(22) Filed: Nov. 8, 2000

(30) Foreign Application Priority Data

Nov. 23, 1999 (EP) .............................................. 99402911

(51) Int. Cl.$^7$ ................................................. H04N 7/12
(52) U.S. Cl. ............................... 375/240.12; 375/240.26
(58) Field of Search ......................... 375/240.02, 240.1, 375/240.12, 240.16, 240.13, 240.14, 240.15, 240.25, 240.26; 348/423.1, 425.1, 425.3, 416.1; 386/111; 382/235–236, 238; 358/261.2, 430

(56) References Cited

U.S. PATENT DOCUMENTS

| | | | |
|---|---|---|---|
| 6,208,759 B1 | * 3/2001 | Wells | 382/232 |
| 6,314,138 B1 | * 11/2001 | Lemaguet | 375/240 |
| 6,393,057 B1 | * 5/2002 | Thoreau et al. | 375/240 |
| 6,483,543 B1 | * 11/2002 | Zhang et al. | 348/390.1 |
| 6,529,555 B1 | * 3/2003 | Saunders et al. | 375/240.26 |
| 6,542,546 B1 | * 4/2003 | Vetro et al. | 375/240.12 |

FOREIGN PATENT DOCUMENTS

| | | | | |
|---|---|---|---|---|
| EP | 001079630 A1 | * 2/2001 | ............ | H04N/7/24 |
| WO | WP 97 08898 | * 3/1997 | ............ | H04N/7/26 |
| WO | WO9905870 | 2/1999 | ............ | H04N/7/58 |

OTHER PUBLICATIONS

Youn et al., "Adaptive motion vector refinement for high performance transcoding", IEEE, International Conference on Image Processing, vol. 3, pp. 596–600.*

* cited by examiner

Primary Examiner—Vu Le
(74) Attorney, Agent, or Firm—Russell Gross

(57) ABSTRACT

A switching device SW allows to switch from a first compressed data input stream IS1 to a second compressed data input stream IS2, resulting in a compressed data output stream OS. This switching device comprises a buffer system BS intended to store the data contained in the first and second input streams, and control means CONT which controls the storage of the input streams in the buffer system in order to switch, at a switch request SWR, from the first input stream to the second input stream, using a commutation device COM.

A transcoding system TS is intended to receive the data stream at the output of the commutation device and to provide the output stream in a seamless way. The use of a transcoding system allows to avoid an underflow or an overflow of the buffer of the decoder that will have to decode the output stream. Moreover, said transcoding system allows to encode the output stream at a bit rate R, where R may be different from the bit rate R1 of the first input stream and the bit rate R2 of the second input stream.

8 Claims, 6 Drawing Sheets

SEAMLESS SWITCHING OF MPEG VIDEO STREAMS

FIELD OF THE INVENTION

The present invention relates to a method of and its corresponding device for switching from a first compressed data input stream to a second compressed data input stream, resulting in a compressed data output stream.

Such an invention can be useful, for example, for switching and editing MPEG compressed video signals.

BACKGROUND OF THE INVENTION

International patent application WO 99/05870 describes a method and device of the above kind. This patent application relates, in encoding/decoding systems, to an improved method of switching from a first encoded video sequence to a second one. In order to avoid underflow or overflow of the decoded buffer, a transcoding of the input streams is used to shift the temporal position of the switching point and to obtain at the output of the transcoders, streams containing an identical entry point and the same decoder buffer characteristics.

The previously described method has several major drawbacks. According to the background art, the output bit rate of each transcoder is equal to its input bit rate, which makes the switching method not very flexible. Moreover, said method implies that the first picture of the second video sequence just after the switch will be an Intra-coded (I) picture.

Finally, the solution of the background art is rather complex and costly to implement as the switching device needs two transcoders.

SUMMARY OF THE INVENTION

It is an object of the invention to provide a method of switching and its corresponding device that is both flexible and easy to implement.

To this end, the invention relates to a switching device as described in the field of the invention and comprising:
- a buffer system intended to store the data contained in the first and second input streams,
- control means intended to control the storage of the input streams in the buffer system in order to switch, at a switch request, from the first input stream to the second input stream using a commutation device,
- and a transcoding system intended to provide the output stream in a seamless way from the output of the commutation device.

The present invention allows to switch from a first compressed data stream encoded at a bit rate R1 to a second compressed data stream encoded at a bit rate R2, the output stream resulting from the switch being encoded again, using the transcoding system, at a bit rate R where R may be different from R1 and R2. Thus, such a switching device has a flexible behavior.

The switching device according to the invention is also characterized in that:
- the buffer system comprises a first buffer and a second buffer intended to store the data contained in the first and the second input stream, respectively,
- the transcoding system comprises one transcoder,
- the commutation device is controlled to switch from the output of the first buffer to the output of the second buffer when said first buffer has transmitted a set of M pictures of the first input stream, said second buffer being controlled by the control means to transmit an I picture,
- and said switching device comprises means for generating B pictures without forward predictions for a set of M pictures of the second input stream including said I picture.

As this switching device uses only one transcoder, its implementation will be less complex and less expensive.

Finally, the switching device according to the invention is characterized in that:
- the buffer system comprises a first buffer and a second buffer intended to store the data contained in the first and the second input stream, respectively,
- the transcoding system comprises, in association with each input stream, first means for decoding and second means for decoding,
- the commutation device is controlled to switch from the first input stream after decoding by the first means to the second input stream after decoding by the second means when the first buffer has transmitted a set of M pictures of the first input stream, the second buffer being controlled by the control means to transmit an I picture or a P picture, which is re-encoded as an I picture using decoding-encoding means,
- and said switching device comprises means for generating B pictures without forward predictions for a set of M pictures of the second input stream including said I picture.

Such a switching device allows to switch to a second compressed video stream that is starting with a P picture. Thus, the flexibility of the system is increased.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
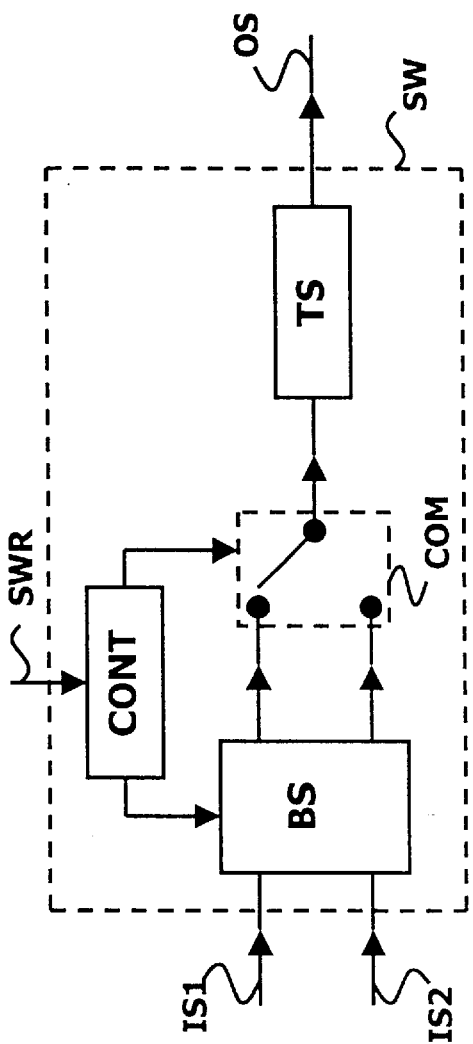
FIG. 1 is a block diagram corresponding to a switching device according to the invention.

The present invention relates to an improved device for switching and editing of compressed data signals. It relates, more especially, to MPEG signals but is also applicable to any type of compressed data such as, for example, those provided by H-261 or H-263 standards of the International Telecommunication Union (ITU). The principle of the switching device according to the invention is depicted in FIG. 1.

Such a switching device SW allows to switch from a first compressed data input stream IS1 to a second compressed data input stream IS2, resulting in a compressed data output stream OS.

This switching device comprises a buffer system BS intended to store the data contained in the first and second input streams, and control means CONT which controls the storage of the input streams in the buffer system in order to switch, at a switch request SWR, from the first input stream to the second input stream, using a commutation device COM.

A transcoding system TS is intended to receive the data stream at the output of the commutation device and to provide the output stream in a seamless way. The use of a transcoding system allows to avoid an underflow or an overflow of the buffer of the decoder that will have to decode the output stream. Moreover, said transcoding system allows to encode the output stream at a bit rate R, where R may be different from the bit rate R1 of the first input stream and the bit rate R2 of the second input stream.

Figure 2:
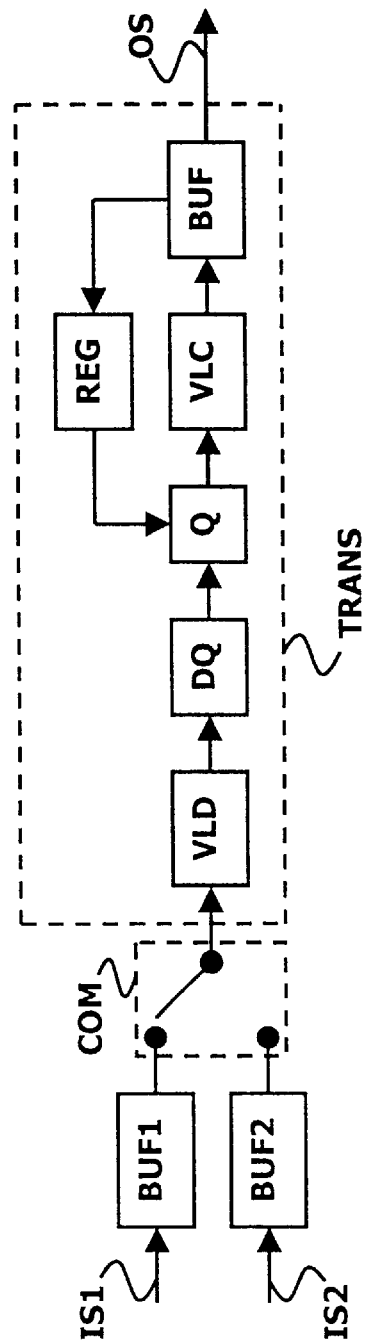
FIG. 2 is a block diagram corresponding to a switching device according to a first embodiment and comprising a transcoder using only requantization means.

The present invention will now be described more specifically for MPEG video data switching. FIG. 2 is a block diagram corresponding to a first embodiment of a switching device of MPEG video streams. In this first embodiment, the switching device comprises:
- a first buffer BUF1 and a second buffer BUF2 intended to store the data contained in the first and the second input stream, respectively,
- a commutation device COM, and
- a transcoder TRANS.

The switching operation from a first video input stream to a second video input stream can be performed if the second input stream starts, in the order of transmission, with a picture with no reference to the past (Intra-coded (I) picture) and if the last presented picture of the first input stream, in the order of display, has no reference to the future (Predicted (P) picture or I picture). Furthermore, the bidirectional (B) pictures following, in the order of transmission, the first inserted picture of the second input stream shall not contain forward predictions, that is, the first inserted Group Of Pictures (GOP) of the second input stream has to be a closed GOP. For this purpose, the switching device according to the invention also comprises means for generating B pictures without forward predictions for the first set of M pictures of the second input stream transmitted after switching, M being the distance between two consecutively I or P pictures.

As a first consequence, if the second input stream does not start with a closed GOP, then the first B pictures following the I picture will be:
- either ejected
- or replaced by Uniform Color (UC) pictures obtained by freezing the last picture, in the order of display of the first input stream, or by freezing the first I picture of the second input stream.

As a second consequence, the commutation device is intended to switch from the output of the first buffer to the output of the second buffer when said first buffer has transmitted a set of M pictures, said second buffer being ready to transmit an I picture. To this end, the two buffers are at least N pictures long, where N is the distance between two consecutive I pictures and are filled using a writing pointer and read using a reading pointer, the writing and reading pointers being controlled by a controller. At a switch request, the reading of the current set of M pictures ($P_k B_{k-2} B_{k-1}$ or $I_k B_{k-2} B_{k-1}$ in the order of transmission and $B_{k-2} B_{k-1} P_k$ or $B_{k-2} B_{k-1} I_k$ in the order of display) in the first buffer is first completed, then the commutation device switches to the output of the second buffer while the reading pointer of the second buffer is positioned at the beginning of the current I picture.

The transcoder according to the invention comprises a Variable Length Decoding block VLD and a dequantization block DQ for decoding the incoming stream, connected in series to a quantization block Q and a Variable Length Coding block VLC for re-encoding the stream, and a buffer BUF. To prevent overflow or underflow of this buffer, a regulation REG is performed; the buffer occupancy is controlled by a feedback to the DCT coefficient quantization. When switching from a video sequence encoded at a bit rate R1 to another one that has been separately encoded at a bit rate R2, the respective decoder buffer delays at the switching point do not match. The role of the transcoder is to compensate the difference between these buffer delays in order to provide the output stream OS in a seamless way. Furthermore, the encoded bit rate R of the output stream can be chosen by the user.

In this first embodiment, the first picture of the second input stream can only be an I picture, as this first picture must not have reference to previous pictures, which are included in the first input stream. Moreover, the switching operation is reversible, which means that, at a switch request, a switch can also be made from the second input stream to the first input stream.

Figure 3:
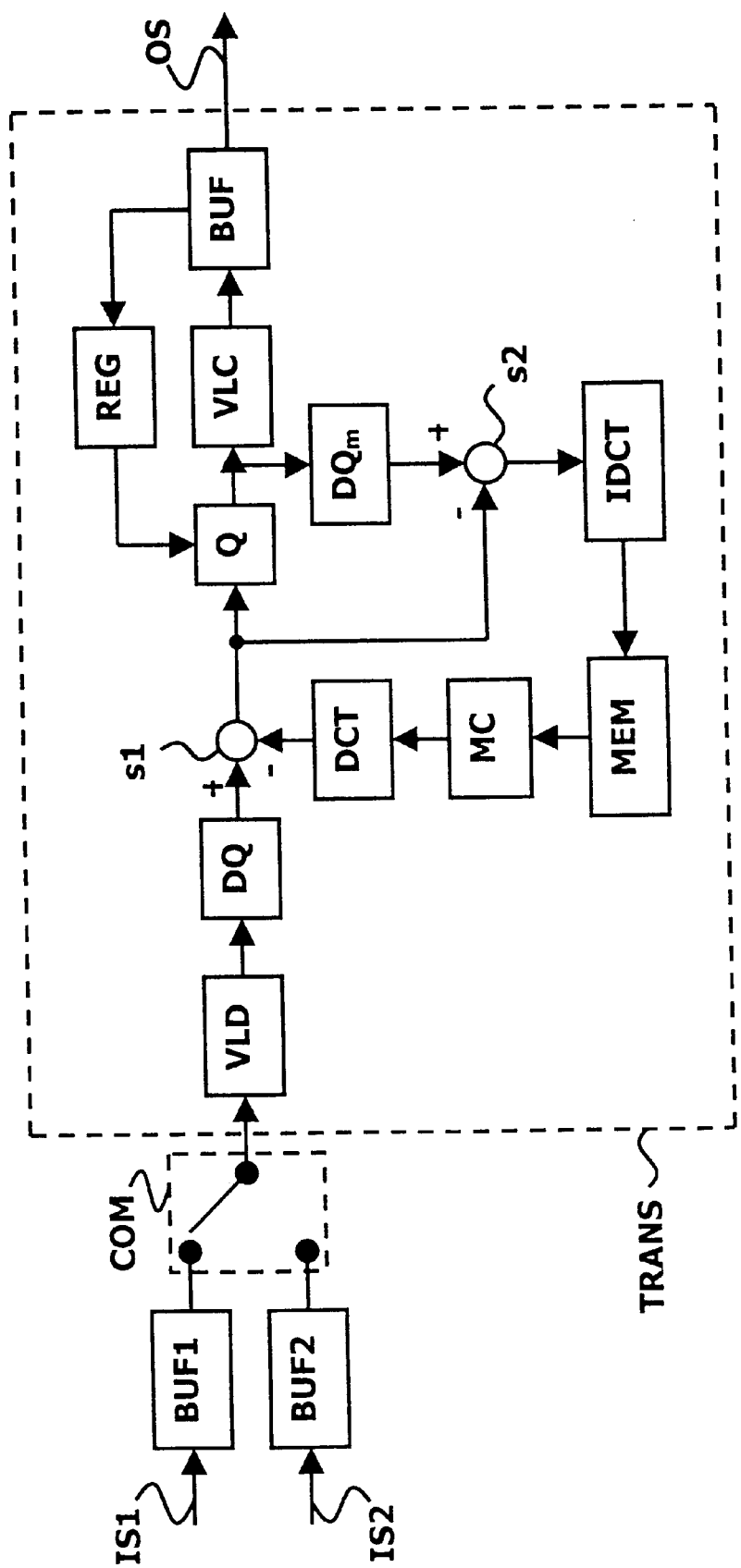
FIG. 3 is a block diagram corresponding to a switching device according to a first embodiment and comprising a transcoder using motion compensation means.
Figure 4:
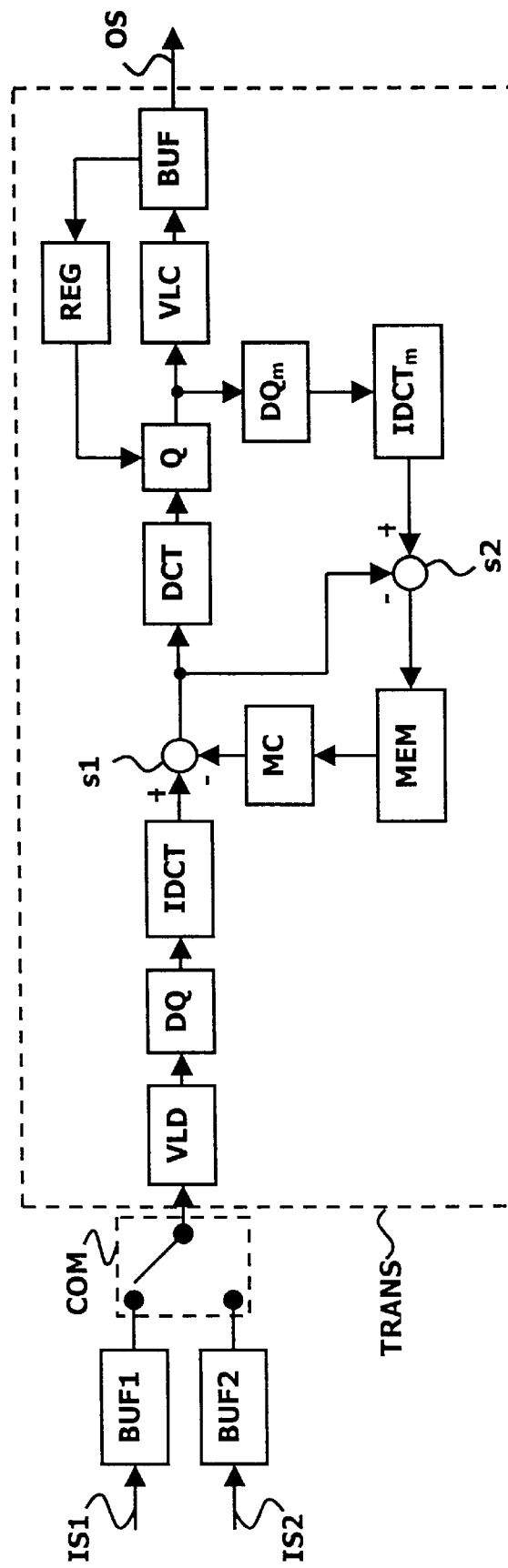
FIG. 4 is a block diagram corresponding to a switching device according to a first embodiment and comprising a transcoder using improved motion compensation means.

The transcoder of FIG. 2 is a simple one which mainly contains requantization means. FIGS. 3 and 4 show a switching device comprising more complex transcoders using motion compensation means. Such motion compensation means are used to correct the error drift on P/B pictures that occurs when only requantization means are used.

In FIG. 3, the transcoder comprises:
- a decoding channel comprising a Variable Length Decoding block VLD connected in series to a dequantization block DQ,
- an encoding-decoding channel comprising a quantization block Q connected in series to a Variable Length Coding block VLC, the output of the quantization block also being connected to an extra dequantization block $DQ_m$,
- an interface sub-assembly connected between the decoding channel and the encoding-decoding channel, and comprising:
    - a first subtractor s1, whose positive input receives the output of the decoding channel and whose output is connected to the input of the Q block,
    - a second subtractor s2, whose positive input receives the output of the $DQ_m$ block and whose negative input is connected to the output of the first subtractor,
    - an Inverse Discrete Cosine Transform block IDCT, a frame memory MEM, a motion compensation block MC and a Discrete Cosine Transform block DCT, all connected in series between the output of the second subtractor and the negative input of the first subtractor, the motion compensation being performed from motion vectors representing the motion of each macro-block of the current picture relative to the corresponding macro-block of a previous picture in the transmission order.

In FIG. 4, the transcoder is more sophisticated and comprises:
- a decoding channel comprising a Variable Length Decoding block VLD connected in series to a dequantization block DQ and an Inverse Discrete Cosine Transform block IDCT,
- an encoding-decoding channel comprising a Discrete Cosine Transform block DCT connected in series to a quantization block Q and a Variable Length Coding block VLC, the output of the quantization block also being connected to an extra dequantization block $DQ_m$ followed by an extra Inverse Discrete Cosine Transform block $IDCT_m$,
- an interface sub-assembly, connected between the decoding channel and the encoding-decoding channel, and comprising:
  - a first subtractor s1, whose positive input receives the output of the decoding channel and whose output is connected to the input of the DCT block,
  - a second subtractor s2, whose positive input receives the output of the $IDCT_m$ block and whose negative input is connected to the output of the first subtractor,
  - a frame memory MEM and a motion compensation block MC connected in series between the output of the second subtractor and the negative input of the first subtractor.

Figure 5:
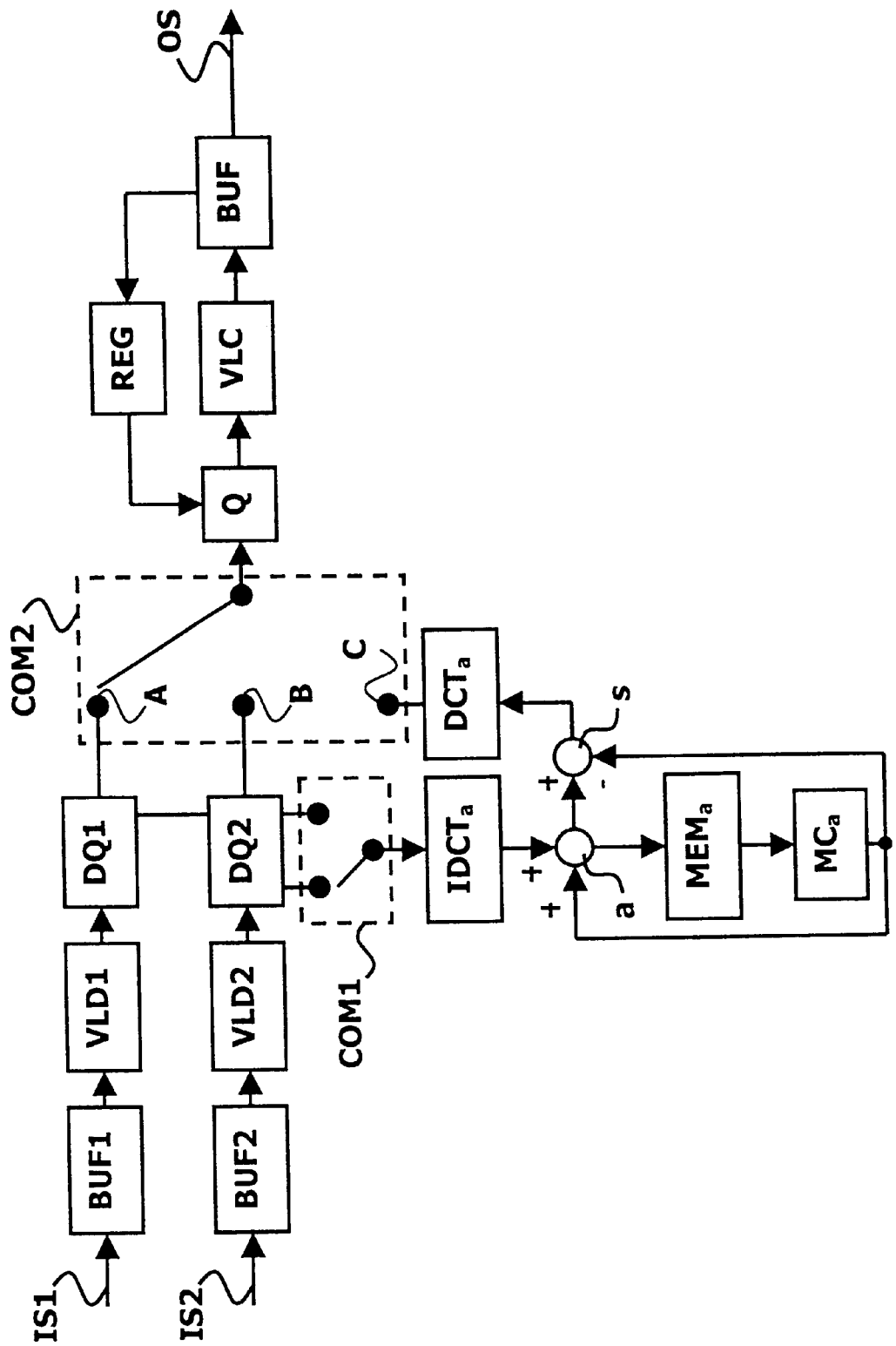
FIG. 5 is a block diagram corresponding to a switching device according to a second embodiment and comprising a transcoding system using only requantization means.

FIG. 5 is a block diagram corresponding to a second embodiment of the switching device. In this second embodiment, the switching device comprises:
- a buffer system comprising a first buffer BUF1 and a second buffer BUF2, said buffers being at least M pictures long,
- a transcoding system comprising:
  - a first decoding channel, whose input corresponds to the output of the first buffer, comprising a first Variable Length Decoding block VLD1 connected in series to a first dequantization block DQ1,
  - a second decoding channel, whose input corresponds to the output of the second buffer, comprising a second Variable Length Decoding block VLD2 connected in series to a second dequantization block DQ2,
  - an encoding channel comprising a quantization block Q connected in series to a Variable Length Coding block VLC and a buffer BUF providing the encoding output stream OS, regulation means REG for controlling the buffer occupancy by a feedback to the quantization block,
  - a commutation device comprising a first commutator COM1, whose inputs are the outputs of the dequantization blocks DQ1 and DQ2 and which is connected, before switching from the first input stream to the second input stream, to the output of the DQ2 block, and a second commutator COM2 having three inputs A, B and C, whose input A is the output of the dequantization block DQ1, whose input B is the output of the dequantization block DQ2 and whose output C is the input of the encoding channel,
  - and a decoder comprising
    - an Inverse Discrete Cosine Transform block $IDCT_a$,
    - an adder a, whose first input is the output of the $IDCT_a$ block and a subtractor s, whose positive input is the output of the adder,
    - a frame memory $MEM_a$ and a motion compensation block $MC_a$ connected in series, on the one hand to the output of the adder and, on the other hand to the second input of the adder and the negative input of the subtractor,
    - and a Discrete Cosine Transform block $DCT_a$, which receives the output of the subtractor and whose output is the third input C of the commutator COM2.

In comparison with the previous schemes, the decoder has been added and allows to switch from a first input stream to a second input stream at a P picture of said second input stream. For this purpose, the decoder decodes all the P picture of the second input stream arriving before the switch from the first input stream to the second input stream. During this step, the first input stream is transcoded. Once the user wants to switch to the second input stream, the last decoded P picture, provided at the output of the $IDCT_a$ block, is re-encoded as an I picture provided at the output of the adder. Furthermore, the B pictures following this new I picture are modified into B pictures having only backward vectors thanks to the motion compensation means $MC_a$ and the subtractor. B pictures without forward predictions are, for example, uniform color pictures as previously described in the first embodiment.

As a consequence, at a switch request, the reading of the current set of M pictures in the first buffer is completed first. Then, the commutator COM2 switches from input A to input C, the decoder being ready to transmit the decoded P picture that has been re-encoded as an I picture and the rest of the set of M pictures. Finally, the commutator COM2 switches from C to B, the reading pointer of the second buffer being positioned at the beginning of the second set of M pictures.

In this second embodiment, the first picture of the second input stream can be an I picture or a P picture. The switching operation is also reversible, which means that a switch can be made, at a switch request, from the second input stream to the first input stream, the commutator COM1 being connected, before the switch, to the output of the DQ1 block and the commutator COM2 being positioned at input B.

Figure 6:
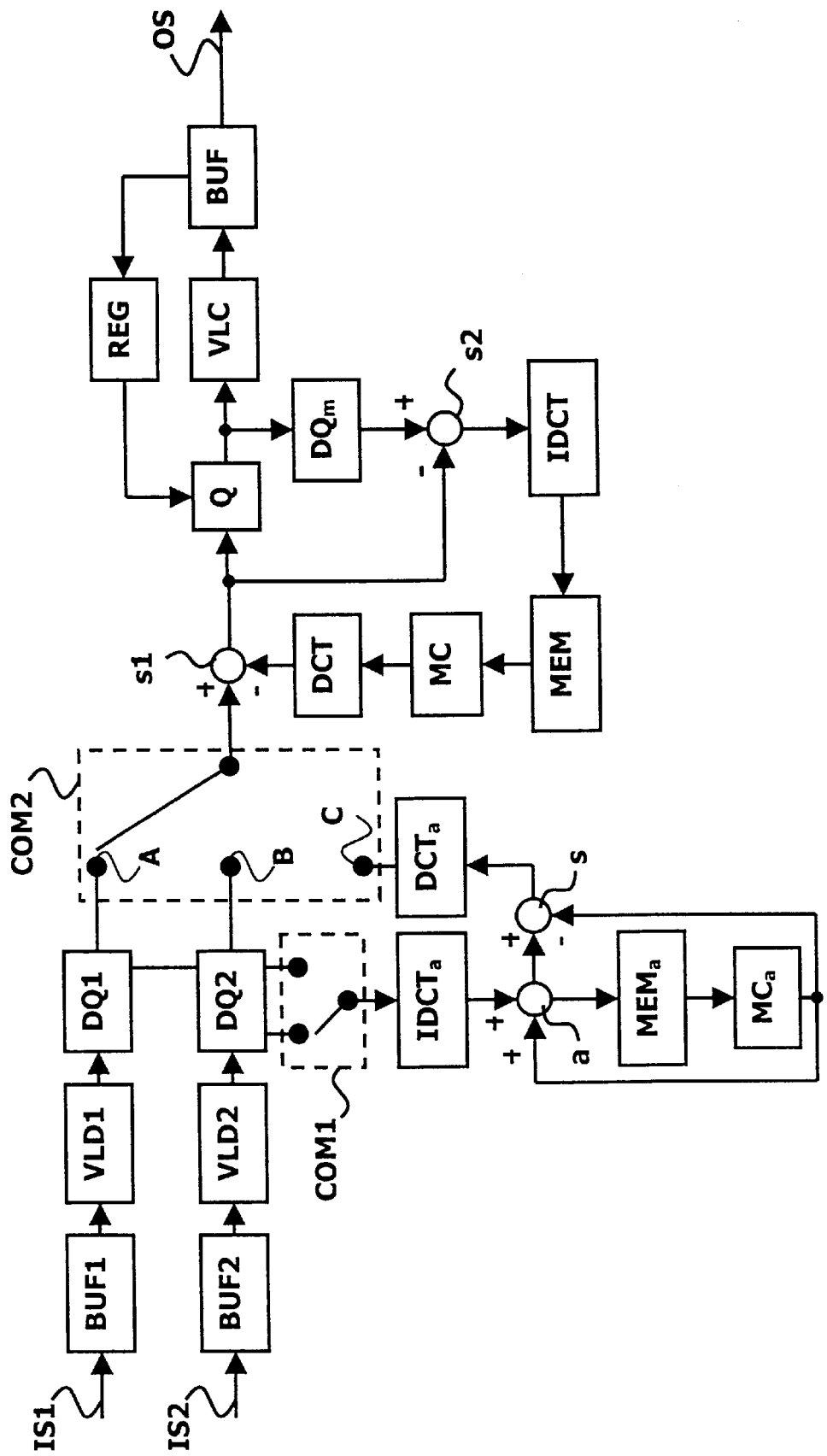
FIG. 6 is a block diagram corresponding to a switching device according to a second embodiment and comprising a transcoding system using motion compensation means.
Figure 7:
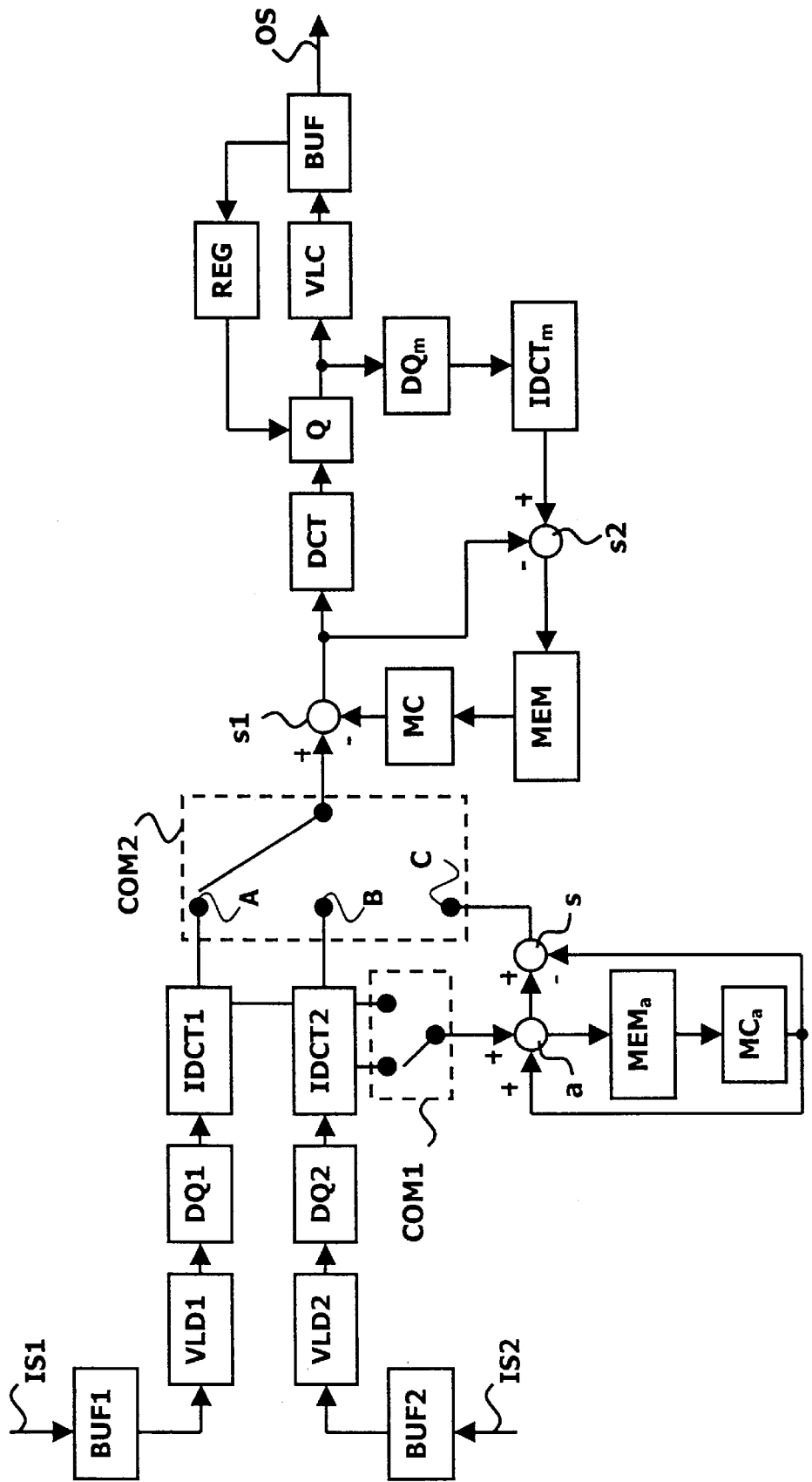
FIG. 7 is a block diagram corresponding to a switching device according to a second embodiment and comprising a transcoding system using improved motion compensation means.

The transcoder of FIG. 5 is a simple one that mainly contains a requantization step. FIGS. 6 and 7 show a switching device comprising more complex transcoders using motion compensation means.

In FIG. 6, the transcoder comprises:
- an interface sub-assembly, connected between the second commutator and the encoding channel, and comprising:
  - a first subtractor s1, whose positive input receives the output of the second commutator and whose output is connected to the input of the Q block,
  - a second subtractor s2, whose positive input receives the output of a dequantization block $DQ_m$ connected to the output of the Q block, and whose negative input is connected to the output of the first subtractor,
  - an Inverse Discrete Cosine Transform block IDCT, a frame memory MEM, a motion compensation block MC and a Discrete Cosine Transform block DCT, all connected in series between the output of the second subtractor and the negative input of the first subtractor.

In FIG. 7, the transcoder comprises:
- the two decoding channels described in FIG. 5 with, in addition, an Inverse Discrete Cosine Transform block IDCT1 or IDCT2 connected between the output of DQ1 or DQ2 block and the input A or B of the second commutator, respectively,
- the encoding channel described in FIG. 5 with, in addition, a Discrete Cosine Transform block DCT located before the Q block,
- a third decoding channel connected to the output of the Q block and comprising an extra dequantization block $DQ_m$ followed by an extra Inverse Discrete Cosine Transform block $IDCT_m$, an interface sub-assembly, connected between the second commutator and the encoding channel, and comprising:
a first subtractor s1, whose positive input receives the output of second commutator and whose output is connected to the input of the DCT block,
a second subtractor s2, whose positive input receives the output of the $IDCT_m$ block and whose negative input is connected to the output of the first subtractor,
a frame memory MEM and a motion compensation block MC connected in series between the output of the second subtractor and the negative input of the first subtractor.

What is claimed is:

1. A device for switching (SW) from a first compressed data input stream (IS1) to a second compressed data input stream (IS2), resulting in a compressed data output stream (OS), said switching device comprising:
a buffer system (BS) to store the data contained in the first and second input streams,
control means (CONT) to control the storage of the input streams in the buffer system in order to switch, at a switch request (SWR), from the first input stream to the second input stream using a commutation device (COM),
and a transcoding system (TS) including a quantization block and a buffer, wherein occupancy of the buffer in the transcoding system is controlled by feedback to the quantization block to provide the output stream in a seamless way from the output of the commutation device.

2. A switching device for switching (SW) from a first compressed data input stream (IS1) to a second compressed data input stream (IS2), resulting in a compressed data output stream (OS), said switching device comprising:
a buffer system (BS) intended to store the data contained in the first and second input streams,
control means (CONT) to control the storage of the input streams in the buffer system in order to switch, at a switch request (SWR), from the first input stream to the second input stream using a commutation device (COM),
and a transcoding system (TS) to provide the output stream in a seamless way from the output of the commutation device,
wherein the buffer system comprises a first buffer (BUF1) and a second buffer (BUF2) intended to store the data contained in the first and the second input stream, respectively,
wherein the transcoding system comprises one transcoder,
the commutation device is controlled to switch from the output of the first buffer to the output of the second buffer when said first buffer has transmitted a set of M pictures of the first input stream, said second buffer being controlled by the control means to transmit an I picture,
and said switching device comprises means for generating B pictures without forward predictions for a set of M pictures of the second input stream including said I picture.

3. A switching device for switching (SW) from a first compressed data input stream (IS1) to a second compressed data input stream (IS2), resulting in a compressed data output stream (OS), said switching device comprising:
a buffer system (BS) to store the data contained in the first and second input streams,
control means (CONT) to control the storage of the input streams in the buffer system in order to switch, at a switch request (SWR), from the first input stream to the second input stream using a commutation device (COM),
and a transcoding system (TS) to provide the output stream in a seamless way from the output of the commutation device,
wherein the buffer system comprises a first buffer and a second buffer intended to store the data contained in the first and the second input stream, respectively,
wherein the transcoding system comprises, in association with each input stream, first means for decoding and second means for decoding,
the commutation device is controlled to switch from the first input stream after decoding by the first means to the second input stream after decoding by the second means when the first buffer has transmitted a set of M pictures of the first input stream, the second buffer being controlled by the control means to transmit an I picture or a P picture, which is re-encoded as an I picture using decoding-encoding means,
and said switching device comprises means for generating B pictures without forward predictions for a set of M pictures of the second input stream including said I picture.

4. A method of switching from a first compressed data input stream to a second compressed data input stream, resulting in a compressed data output stream, said method of switching comprising the steps of:
buffering, in which the data contained in the first and the second input stream are stored,
controlling the storage of the input streams during the buffering step in order to switch, at a switch request, from the first input stream to the second input stream,
transcoding the stream provided by the control step, the transcoding includes controlling occupancy of a buffer by feedback to DCT coefficient quantization in order to provide the output stream in a seamless way.

5. A method of switching from a first compressed data input stream to a second compressed data input stream, resulting in a compressed data output stream, said method of switching comprising the steps of:
buffering, in which the data contained in the first and the second input stream are stored,
controlling the storage of the input streams during the buffering step in order to switch, at a switch request, from the first input stream to the second input stream,
transcoding the stream provided by the control step in order to provide the output stream in a seamless way,
wherein the transcoding step comprises one transcoding channel,
the control step allows to switch, at a switch request, from the first input stream to the second input stream when the buffering step has transmitted a set of M pictures of the first input stream, the buffering step being controlled to transmit an I picture,
and said method of switching comprises a step of generating B pictures without forward predictions for a set of M pictures of the second input stream including said I picture.

6. A method of switching from a first compressed data input stream to a second compressed data input stream, resulting in a compressed data output stream, said method of switching comprising the steps of:

buffering, in which the data contained in the first and the second input stream are stored, controlling the storage of the input streams during the buffering step in order to switch, at a switch request, from the first input stream to the second input stream, transcoding the stream provided by the control step in order to provide the output stream in a seamless way wherein the transcoding step comprises a first sub-step of decoding the first input stream and a second sub-step of decoding the second input stream, the control step allows to switch, at a switch request, from the first input stream after the first decoding step to the second input stream after the second decoding step when the buffering step has transmitted a set of M pictures of the first input stream, the buffering step being controlled to transmit an I picture or a P picture, which is re-encoded as an I picture using a decoding-encoding step, and said method of switching comprises a step of generating B pictures without forward predictions for a set of M pictures of the second input stream including said I picture.

7. A device for switching (SW) from a first compressed data input stream (IS1) to a second compressed data input stream (IS2), resulting in a compressed data output stream (OS), said switching device comprising:

a buffer system (BS) intended to store the data contained in the first and second input streams, control means (CONT) intended to control the storage of the input streams in the buffer system in order to switch, at a switch request (SWR), from the first input stream to the second input stream using a commutation device (COM), and a transcoding system (TS) intended to provide the output stream in a seamless way from the output of the commutation device, means for generating B pictures without forward predictions for a set of M pictures of the second input stream including an I picture.

8. A method of switching from a first compressed data input stream to a second compressed data input stream, resulting in a compressed data output stream, said method of switching comprising the steps of:

buffering, in which the data contained in the first and the second input stream are stored, controlling the storage of the input streams during the buffering step in order to switch, at a switch request, from the first input stream to the second input stream, transcoding the stream provided by the control step in order to provide the output stream in a seamless way, generating B pictures without forward predictions for a set of M pictures of the second input stream including an I picture.

* * * * *